United States Patent

Shtipelman et al.

[11] Patent Number: 5,856,964
[45] Date of Patent: Jan. 5, 1999

[54] MULTIHEAD OPTICAL DISC DRIVES WITH DIRECT READING AFTER WRITING OPERATION

[75] Inventors: Boris A. Shtipelman, Rochester; Edward C. Gage, Fairport, both of N.Y.

[73] Assignee: Eastman Kodak Company, Rochester, N.Y.

[21] Appl. No.: 842,580

[22] Filed: Apr. 15, 1997

[51] Int. Cl.$^6$ ...................................................... G11B 7/00
[52] U.S. Cl. ............................................ 369/54; 369/44.14
[58] Field of Search ............................... 369/44.37, 44.38, 369/54, 44.14, 44.21, 44.22, 112, 13

[56] References Cited

U.S. PATENT DOCUMENTS

| | | |
|---|---|---|
| 5,216,660 | 6/1993 | Iimura . |
| 5,392,273 | 2/1995 | Masaki et al. ......................... 369/116 |
| 5,436,880 | 7/1995 | Eastman et al. . |
| 5,444,684 | 8/1995 | Yanagi et al. ........................ 369/44.37 |
| 5,446,716 | 8/1995 | Eastman et al. . |
| 5,495,466 | 2/1996 | Dohmeier et al. . |

FOREIGN PATENT DOCUMENTS

| 727776-A1 | 8/1996 | European Pat. Off. . |
| 4-205821 | 7/1992 | Japan . |

OTHER PUBLICATIONS

Chapter 11 of Optical Recording, by Alan B. Marchant, Addison–Wesley Publishing Company, New York, 1990.

*Primary Examiner*—Thang V. Tran
*Attorney, Agent, or Firm*—Raymond L. Owens

[57] ABSTRACT

Apparatus for optically writing information on or reading information from a disc having tracks includes a carriage moveable in a radial direction relative to the disc tracks and at least first and second optical heads spaced and mounted on the carriage; the first and second optical heads being moveable with the carriage, and at least one of the heads being pivotally mounted; and the first head being adapted to write information on a track of the disc, the second head being adapted to read information and produce a signal representative of recorded data. The apparatus further includes a structure connected to the pivotally mounted head and adapted to pivot the optical head as the carriage is displaced in the radial direction so that both the first and second optical heads are spaced from each other but aligned on the same track within the tracking ability of the head, and an arrangement responsive to the read head signal to adjust operation of first head during writing to improve the recording of data.

4 Claims, 8 Drawing Sheets

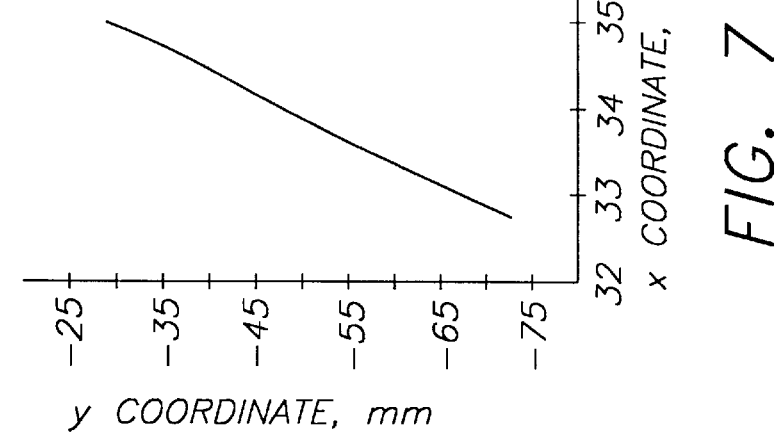
FIG. 7
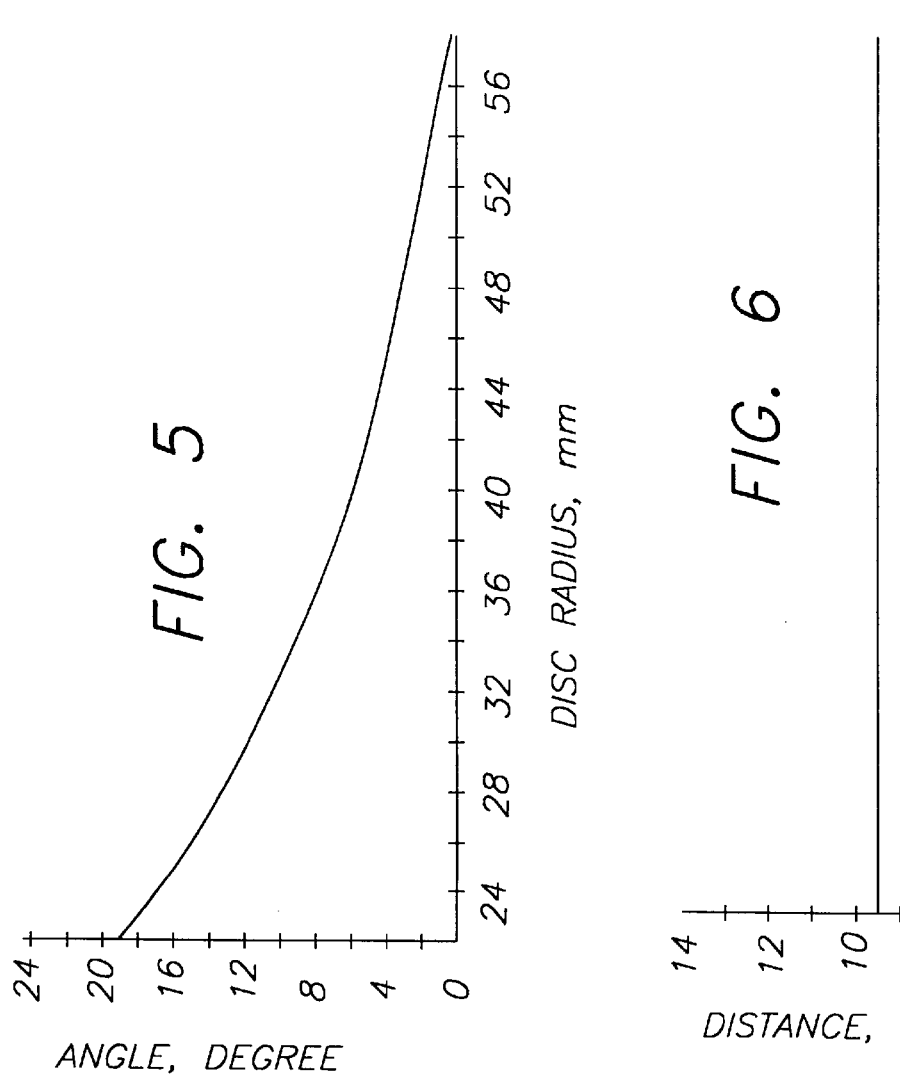
FIG. 5
FIG. 6

MULTIHEAD OPTICAL DISC DRIVES WITH DIRECT READING AFTER WRITING OPERATION

CROSS REFERENCE TO RELATED APPLICATIONS

The present invention is related to U.S. patent application Ser. No. 08/715,267, filed Sep. 16, 1996, entitled "Writing Apparatus Using a Multilayer Optical Data Storage Device" to Edward C. Gage; Randall H. Victora and U.S. patent application Ser. No. 08/821,990, filed Mar. 21, 1997, entitled "Multihead Optical Disc Drives" to Boris A. Shtipelman and Edward C. Gage; and U.S. patent application Ser. No. 08/834,571, filed Apr. 7, 1997, entitled "Direct Read During Mark Formation for Laser Power Correction" to Edward C. Gage, Roger A. Hajjar, Kim Eastman, and Steve Dohmeier, assigned to the assignee of the present invention. The disclosures of these related applications are incorporated herein by reference.

FIELD OF THE INVENTION

The present invention relates to the field of optical data recording and playback and, more particularly, to optical drives with two or more optical heads positioned on a common carriage that permits monitoring of mark formation with correction for laser power during recording.

BACKGROUND OF THE INVENTION

For multihead drives, only one head can be placed on the carriage with the trajectory of the center of the objective lens constantly passing through the center of the disc when the carriage is traveling in the radial direction while accessing the same region of the disc. Relative to that head, any other head, if located on the same carriage, will have to be mounted with some offset. Therefore, positioning of these two heads normal to the same track becomes possible only at one radius of the disc. With a radially moving carriage, at any other radius each of the two heads will be reaching different tracks, and at most one head will be kept normal to the track. If, for instance, such a two-headed arrangement is used in a Direct Reading After Writing (DRAW) drive, direct reading after writing cannot be executed.

A similar two head arrangement is also used in some Digital Versatile Disc (DVD) optical drives where one head reads DVD discs while the required reading of CD discs is executed by the second head. The latter is located at some distance from the center of the carriage (which passes through the center of the disc) that changes the angular orientation of this head with respect to different tracks when the carriage is moving radially from the inner to the outer radii of the disc. Although such angular errors in reading CD discs can be somewhat compensated, the overall radial travel of the carriage must be increased to permit the CD head to reach all tracks of the disc. As a result, the carriage guiding elements together with the linear motor to drive the carriage must be elongated that represents a certain disadvantage of these drives.

In a separate case, as described in EP 727776-A1, information from different recording media is read by one head but equipped with two objective lenses. The latter are mounted on a turning plate included in the pin type fine focus/tracking actuator to permit each lens to be separately brought into the light path to read one or another recording media. The disadvantage of this design may be attributed to the fact that the actuator becomes substantially larger. The increase in moving mass also makes the lens driving motors less efficient. Additionally, since a large turning angle is required to bring each lens into its working position, the air gaps in each of the two focus motors become unbalanced resulting in a combined focus force displaced from the center of the active lens. As a consequence, dynamic behavior of the actuator becomes more complex.

In optical data recording, an optical source, typically a laser or laser diode, generates an incident write signal in the form of a radiation beam. The beam is applied to an optical medium to record data thereon as optically-detectable marks. The quality of recorded data in many optical recording systems is generally very sensitive to laser write power.

In most recording systems, however, optical recording power (ORP) may need to be adjusted during recording because this power varies with fluctuation of different parameters such as media sensitivity, defocus, tilt, substrate thickness, birefringence, scratches, and contamination on the laser-incident substrate surface. One technique for continuously maintaining the ORP involves monitoring a reflection of the write signal from the medium, known as the Mark Formation (MF) signal, while data is being recorded. Systems which monitor the MF signal are generally referred to as Direct Read During Write (DRDW) systems. The MF signal is also used to avoid the need to subsequently read the data after recording by analyzing the MF signal to determine whether or not a mark has been properly formed, or, in other words, whether the data has been properly recorded on the medium.

A technique to servo the laser write power on optical recording media during recording is disclosed, for example, in commonly assigned U.S. Pat. Nos. 5,436,880 and 5,446,716, the disclosures of which are incorporated herein by reference.

Apparatus for generating a mark formation effectiveness signal (MFE) to verify data as it is recorded on an optical medium is disclosed in commonly assigned U.S. Pat. No. 5,495,466, the disclosure of which is incorporated by reference. As disclosed in this patent, the MFE signal estimates a normalized rate of change of the reflected write pulse as a mark is being formed to provide an indication of the quality of mark formation on the optical medium. A technique to generate an MFE signal to control laser write power during recording is also disclosed in U.S. Pat. No. 5,216,660.

These DRDW systems suffer from the difficulty of monitoring mark formation during the write pulse due to considerations of dynamic range and write laser noise. Also, mark formation usually occurs during the cooling process after the thermal recording. The use of a trailing read spot for direct read after write (DRAW) offers a much higher quality mark formation monitoring. For a more complete discussion of DRAW, see Chapter 11 of Optical Recording, by Alan B. Marchant, Addison-Wesley Publishing Company, New York, 1990.

SUMMARY OF THE INVENTION

In view of the foregoing, an object of this invention is to provide for an optical disc drive with a plurality of optical heads which are located on a common carriage but guided in such a way so that each head is aligned on the same track and to use at least one of the read signals to adjust the write operation of one of the heads. It is a further object of the present invention to properly orient the optical heads in the angular direction for any location of the carriage when it moves from the inner to the outer radius of the disc.

These objects are achieved by apparatus for optically writing information on or reading information from a disc having tracks, comprising:

a) a carriage moveable in a radial direction relative to the disc tracks and at least first and second optical heads spaced and mounted on the carriage;

b) the first and second optical heads being moveable with the carriage, and at least one of the heads being pivotally mounted; and c) the first head being adapted to write information on a track of the disc, the second head being adapted to read information and produce a signal representative of recorded data;

d) means coupled to the pivotally mounted head and adapted to pivot the optical head as the carriage is displaced in the radial direction so that both the first and second optical heads are spaced from each other but aligned on the same track within the tracking ability of the head; and e) means responsive to the read head signal to adjust operation of first head during writing to improve the recording of data.

Accordingly, it is an object of the present invention to correct for fluctuations of laser write power during mark formation.

This object is achieved by a recording apparatus for forming marks on a medium, comprising:

(a) means including an adjustable light source for producing a beam of light having first and second portions, with the second portion for recording marks on the medium from the first head;

(b) means for detecting light from the second head which is reflected from the medium and for producing a mark recording quality signal;

(c) means responsive to the mark recording quality signal for adjusting the power of the light source during recording so that the amount of power is adjusted to maintain optimum mark quality.

ADVANTAGES

It is a feature of the present invention that both heads can be mounted on the same carriage which permits ready accessibility to the heads and minimizes the space requirements of optical disc drive.

By having two heads to monitor the written mark quality, a real-time feedback can be used to complement the direct read during write (DRDW) by providing Full Write Verification in one pass and the utilization of DRAW as low frequency correction and target to DRDW.

The use of a head optimized for readout provides more accurate read signals (birefringence, wavelength, numerical aperture), i.e., better crossover to reader, while permitting optimization of write function in the writing head.

In accordance with this invention, an inexpensive and standard read head(s) can be used as the second head.

As with any mechanical system, a multihead optical drive will have imperfections that can result in small radial displacements from one head to another, and crossing of each track may not be exactly normal. Obviously, proper tolerancing will be required for each application, but a quick estimate of some requirements leads to a conclusion of feasibility. For the DRAW application, the read head must access the same track as the write head. With current objective lenses and actuators, that means a radial tolerance of approximately 50 $\mu$m. Given an initial alignment of the heads and cam structure, this seems quite reasonable. The track crossing angle is also quite loose, especially if it is nearly constant as a function of radius so it can be compensated in the tracking signal gain.

A feature of the present invention is that it provides an improved method of determining the characteristics of mark formation used to adjust the laser power during mark formation and to verify recorded mark quality.

Another feature of the present invention is that recording quality is maintained despite changes in medium sensitivity, birefringence, temperature, and defocus.

Yet another feature of the present invention is that distortions in mark formation measurement caused by laser power variations can be corrected because of the isolation of the read function.

A further feature of the present invention is that dynamic range and signal to noise ratio of the mark formation measurement are increased by the use of an optimized read head.

BRIEF DESCRIPTION OF THE DRAWINGS

FIG. 5 is a graph where the turning angle of the pivoting head is presented as a function of the disc radius;

FIG. 6 is a graph where the distance from the objective lens of the head to its pivot center is illustrated as a function of the disc radius;

FIG. 7 is a graph defining the calculated profile of the surface of the cam to pivot the second optical head during radial motion of the carriage;

DETAILED DESCRIPTION OF THE INVENTION

Figure 1:
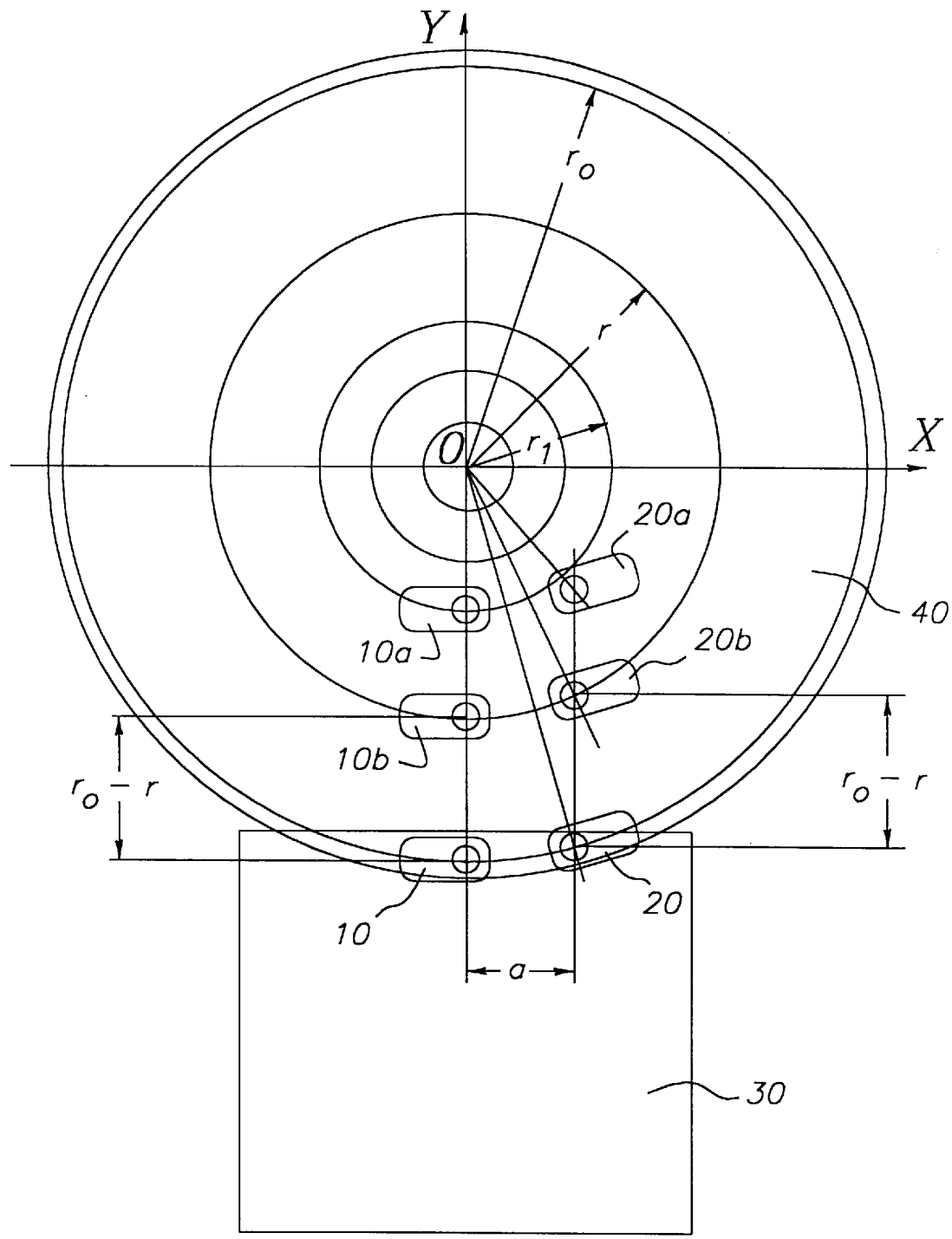
FIG. 1 is a simplified schematic top view of an optical disc drive with two heads located on a common radial access carriage.

Referring to FIG. 1, a multihead optical disc drive of the invention can be viewed as comprising at least two heads 10 and 20 mounted on a common radial access carriage 30. In one of its position, each head can be positioned on the same track and angularly oriented in such a way so that both heads are normal to the track. As illustrated in FIG. 1, this track is shown as being located at the outer radius $r_o$ of the optical disc 40.

When carriage 30 travels between the inner $r_i$ and the outer $r_o$ radii of the disc, any optical head will be normal to all tracks of the disc (including the intermediate one at radius r) if it is mounted on the carriage with the center of its objective lens kept on the disc center line OY which is the Y axis of the coordinate system XOY connected to the center of the disc. Such a head 10 in FIG. 1 is shown in three different positions of the carriage. These positions 10, 10a, and 10b show head 10 as being located on the outer, inner, and intermediate radii of the disc. When this carriage supports the second head 20, the latter has to be separated from head 10 by some offset a. Three similar positions of head 20, denoted as 20, 20a, and 20b, indicate that with the traveling carriage this head will not reach the same tracks as head 10. Additionally, if head 20 in its starting location at radius $r_o$ is oriented at some angle $\alpha_o$ to be normal to the track, a similar condition for all other tracks will not be fulfilled, in other words, head 20 will not be normal to the tracks at any radius other than $r_o$.

Figure 2:
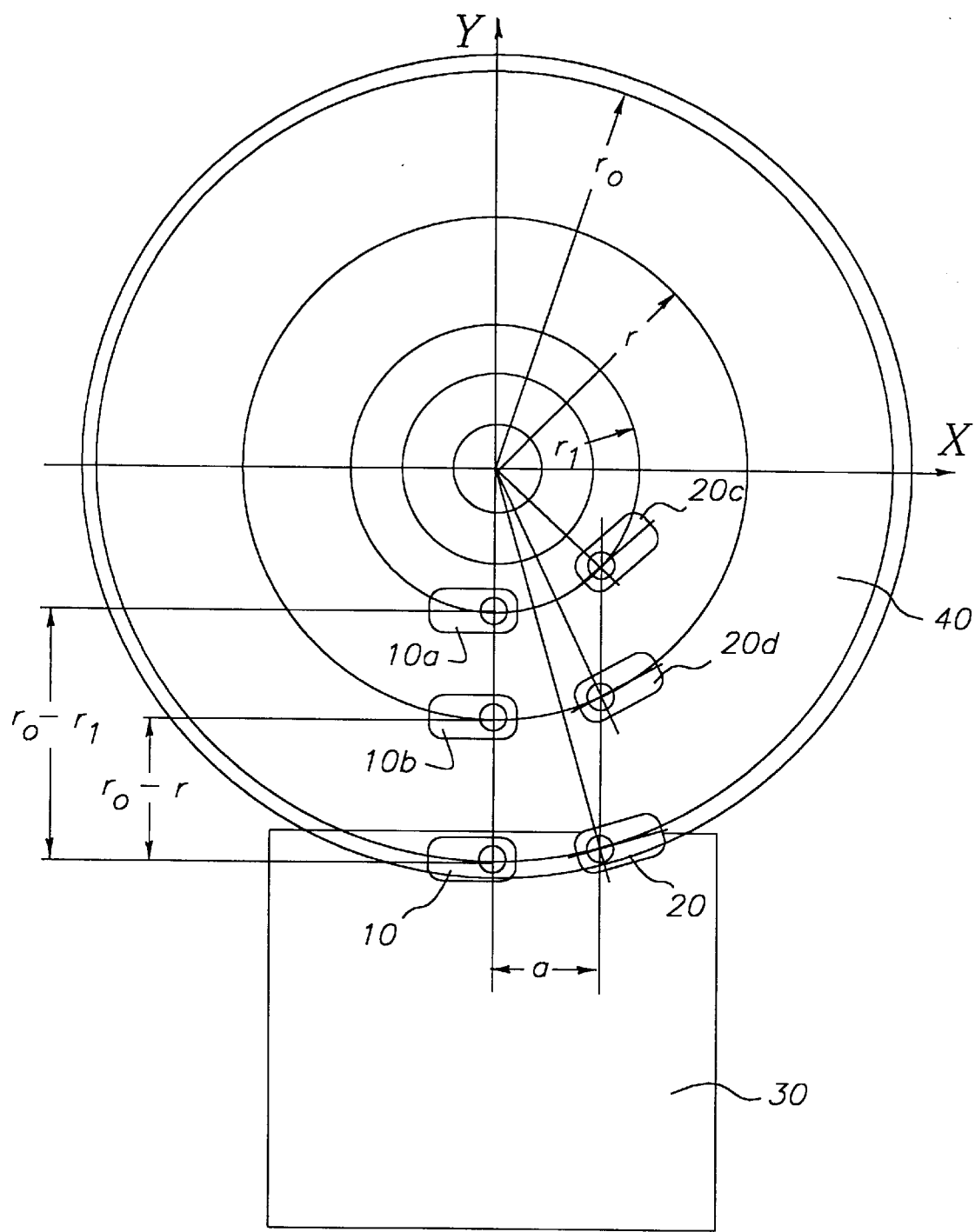
FIG. 2 is a schematic top view of an optical disc drive from FIG. 1 with two heads shown in desirable positions at inner, outer, and intermediate radii of the disc.
Figure 3:
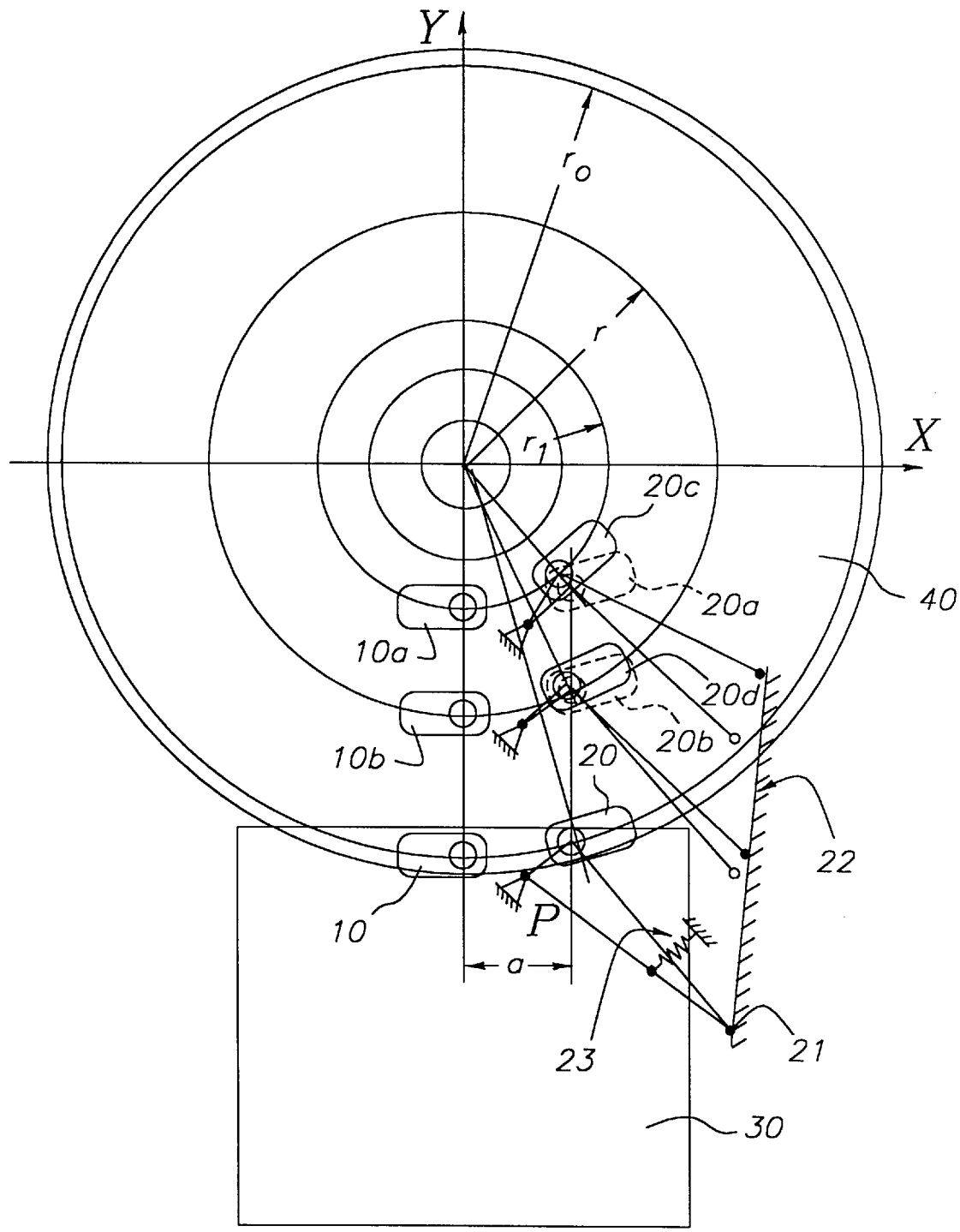
FIG. 3 is a schematic top view of a two-head optical disc drive from FIGS. 1 and 2 where one of the heads is pivoted around a certain predetermined point to achieve its radial and angular position similar to respective positions of the first head defined for any radius of the disc.

Ideally, correct location of head 20 with respect to any track reached by head 10 must correspond with positions illustrated in FIG. 2. Two such positions 20c and 20d illustrate this head for a case when head 10 is relocated to a track at either inner or intermediate radii of the disc. In accordance with the present invention, the optical heads are aligned on the same track so that the cross track direction of both heads remains constant as the heads remain located on the same track. These proper positions of head 20 can be achieved if it is turned around some pivot point P as shown in FIG. 3. Here, similar to FIG. 1, positions 20a and 20b are reached by head 20 when head 10 is brought by the moving carriage into positions 10a and 10b. Similar to FIG. 2, positions 20c and 20d in FIG. 3 show head 20 in its desired locations derived by the moving carriage and simultaneous pivoting of head 20 around point P. This pivoting is executed when a cam follower 21 connected to the body of head 20 is guided by a stationary cam 22. Spring 23 is incorporated to create a constant preload of the cam follower to the cam.

When the described arrangement is utilized, the profile of the cam 22 must insure the proper turning angle of head 20 for all tracks of the disc. The second requirement relates to a necessity to land head 20 on the same track which is reached by head 10, but with the distance between the lens center and pivot P kept constant for all tracks. Such a profile of cam 22 can be derived by examining the geometric construction presented in FIG. 4. Here, the center of the objective lens is located at point $A_o$ when head 20 is placed at the outer radius $r_o$ of the disc. In this position, head 20 is positioned at distance a from line OY along which head 10 is traveling with the moving carriage. Additionally, head 20 is oriented in such a way so that its actuator longitudinal axis $A_o T_o$ is tangent to the outer track at point $A_o$ and, at the same time, perpendicular to the disc radial line $A_o O$. The latter is inclined to OY at an angle $\alpha_o$ which can be calculated as $$\alpha_o = \arcsin(a/r_o) \qquad (1)$$

Figure 4:
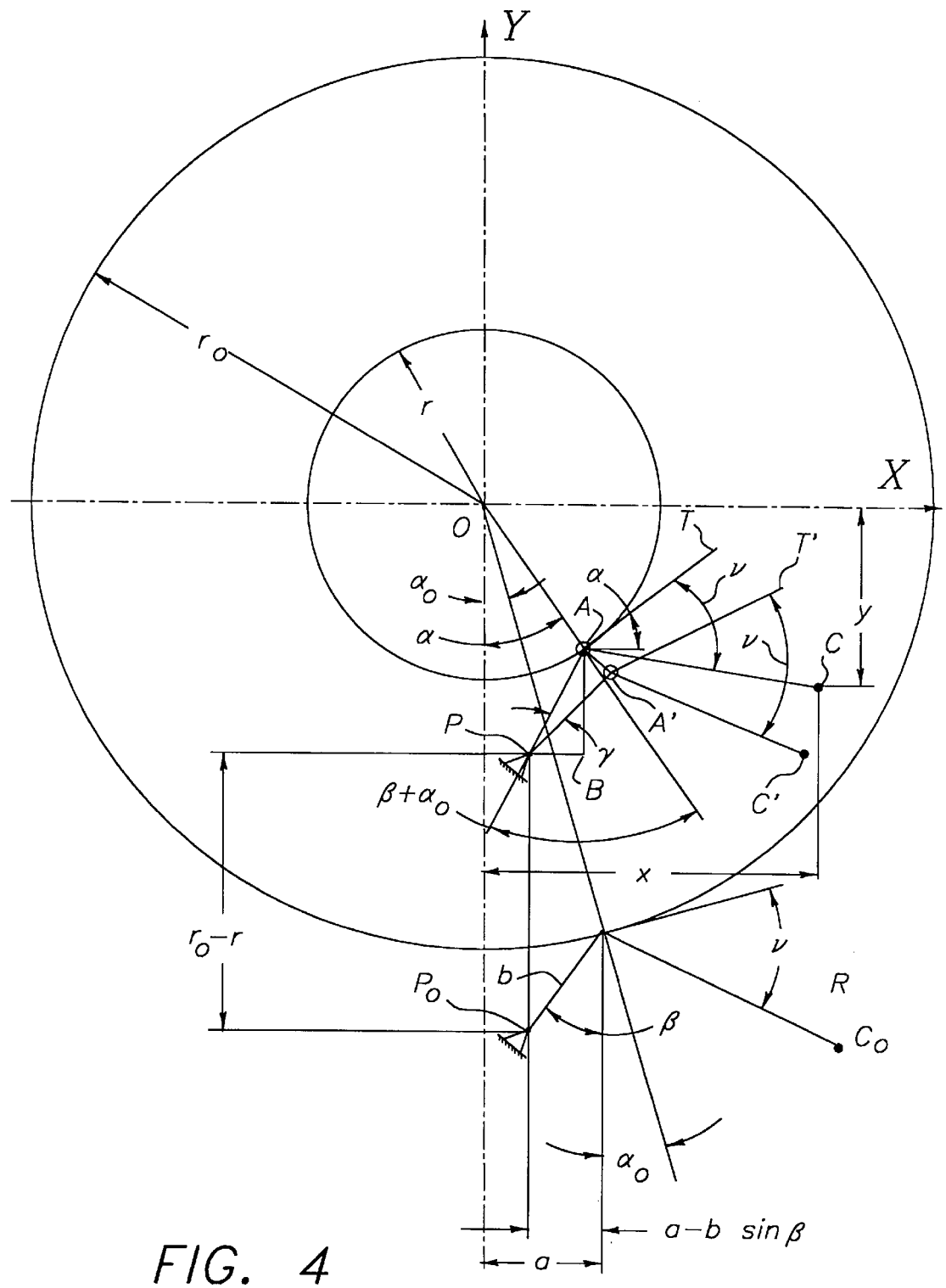
FIG. 4 is a scheme to calculate the geometric position of the pivoting head for any given radius of the optical disc.

Distance b between points $P_o$ and $A_o$ in FIG. 4 defines the initial position of the pivot center. Its location is chosen in such a way so that line $A_o P_o$ is inclined to the line of carriage motion at angle $\beta$. The center of the cam follower supported by the head body is placed at point $C_o$ located from $A_o$ at distance R with line $A_o C_o$ inclined to $A_o T_o$ at some angle v.

When head 10 is moved by the carriage from the outer track at radius $r_o$ to an intermediate track at radius r, lens center $A_o$ of head 20 will be displaced by distance $r_o-r$ to point A'. Similarly, lines $A_o P_o$ and $A_o C_o$ together with the longitudinal axis of the actuator $A_o T_o$ will be translated into respective positions A'P, A'C', and A'T'. As FIG. 4 demonstrates, to locate the lens center A' at point A on the intermediate track at radius r, head 20 must be rotated at some angle $\gamma$ around the pivot point P. As a result, the cam follower center will be displaced to point C and the longitudinal axis of the actuator will occupy a new position AT. To keep head 20 in its correct angular orientation, axis AT, as in its starting position, must be perpendicular to the disc radial line AO. The latter is inclined to OY at some angle $\alpha$ which can be defined as $$\alpha = \arcsin(a/r) \qquad (2)$$

Since in a right angle triangle OAB $$(90° - \beta + \gamma) + (\beta + \alpha_o - \alpha) = 90°$$

angle $\alpha$ will be equal to $$\alpha = \alpha_o + \gamma \qquad (3)$$

To keep head 20 in its correct angular orientation while it is reaching the same track as head 10, angle $\gamma$ and distance b from the lens center to the pivot point P must be calculated by solving the following two equations together:

$$a - r \sin \alpha - b[\sin \beta - \sin (\beta - \gamma)] = 0 \qquad (4)$$

$$r_o(1 - \cos \alpha_o) - r(1 - \cos \alpha) - b[\cos \beta - \cos (\beta - \gamma)] = 0 \qquad (5)$$

These equations are derived by projecting the composite line $OA_o P_o PAO$ on axes X and Y, respectively. After simplification, angle $\gamma$ will be defined from the following expression:

$$[a - r \sin (\alpha_o + \gamma)]\tan(\beta - \gamma/2) + r_o(1 - \cos \alpha_o) - r(1 - \cos (\alpha_o + \gamma)) = 0 \qquad (6)$$

With the calculated value of angle $\gamma$, distance b will be equal to $$b = [a - r \sin(\alpha_o + \gamma)]/[\sin \beta - \sin (\beta - \gamma)] \qquad (7)$$

Values $\gamma$ and b from the last two equations are defined as functions of the changing track radius r. In a practical case, however, the design has to be executed in such a way so that distance b from the lens center to the pivot point P is kept constant for any position of the carriage. Equations (6) and (7) permit us to fulfill this requirement as can be seen in FIGS. 5 and 6 where $\gamma$ and b are separately plotted as a function of r. Here, the calculations are carried out for an optical drive with basic parameters chosen as follows:

$r_o = 58$ mm
$r_i = 22$ mm
$a = 15$ mm
$\beta = 45°$
$v = 60°$

For the stationary cam 22, its profile can be defined in the coordinate system XOY from FIG. 4 by calculating the following x and y coordinates:

$$x = r \sin \alpha + R \cos (v - \alpha) \qquad (8)$$

$$y = -r \cos \alpha - R \sin (v - \alpha) \qquad (9)$$

If an addition to the above drive parameters distance R is chosen to be equal to 25 mm, the cam profile of the cam surface can be plotted as shown in FIG. 7.

Figure 8:
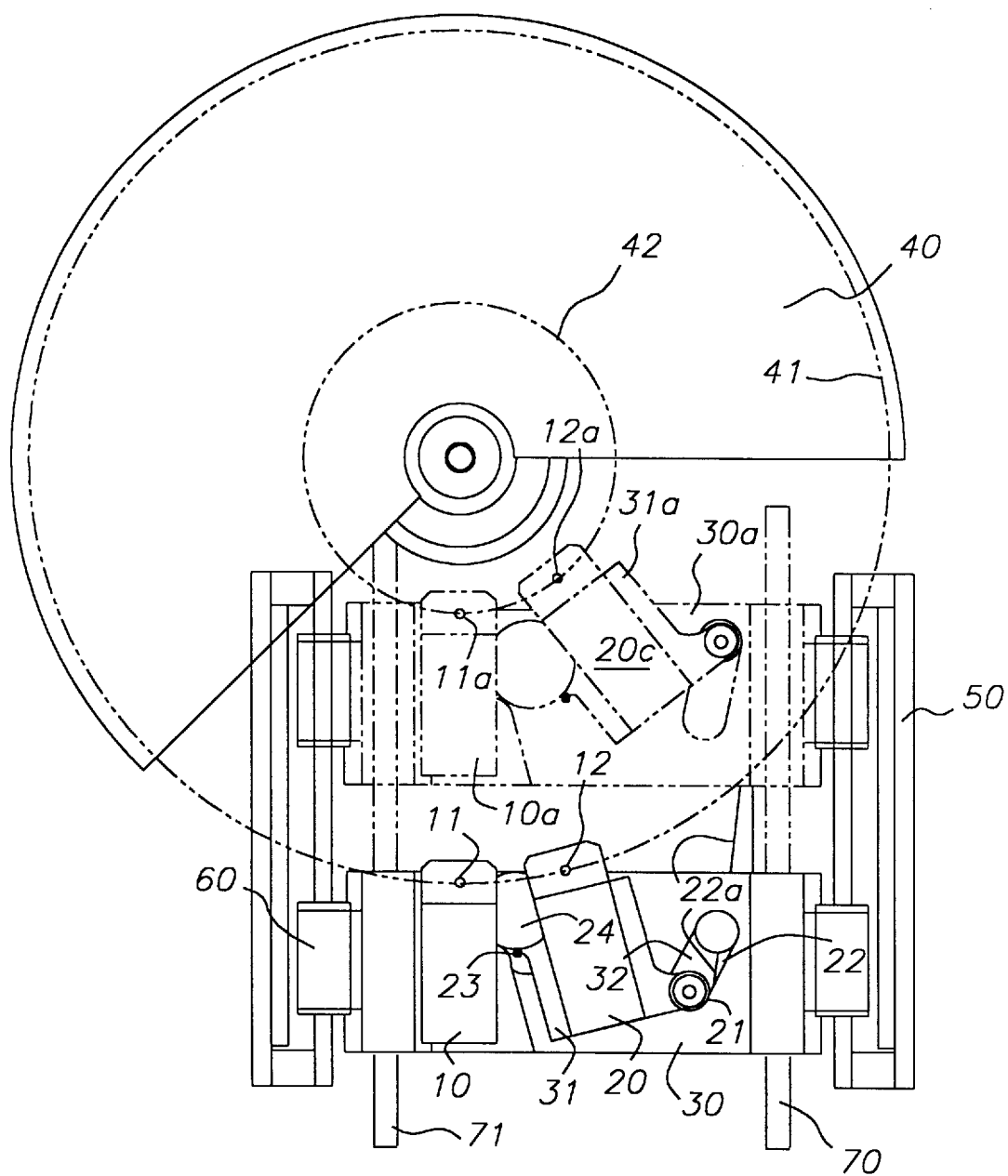
FIG. 8 is a partial top view of an optical disc drive described in this invention with two heads mounted on a common radial access carriage.
Figure 9:
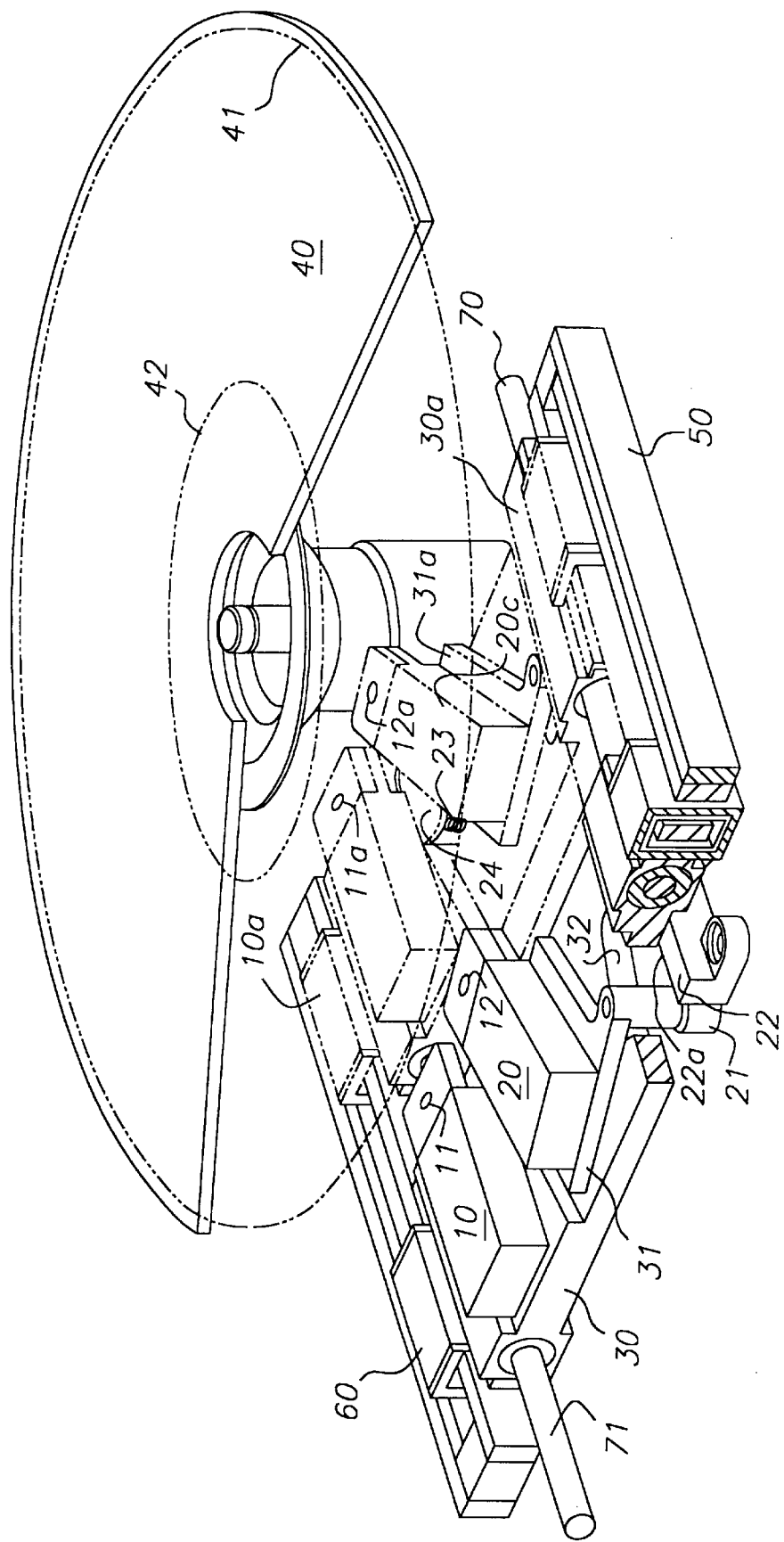
FIG. 9 is a perspective view of the optical disc drive from FIG. 7.

A preferred embodiment of the present invention is demonstrated in FIG. 8 where a partial top view of an optical drive with two heads mounted on a common carriage is presented. A perspective view of the same drive from FIG. 8 is shown in FIG. 9. In each of these two figures, as in FIGS. 1, 2, and 3, heads 10 and 20 are supported by carriage 30 and shown in a position when their respective objective lenses 11 and 12 are located at the outer track 41 of the optical disc 40. Carriage 30 is guided by two rods 70 and 71 and is radially driven by two linear motors 50 and 60. Head 10 is mounted on the carriage in such a way so that trajectory of its objective lens 11 is passing through the center of the disc during radial motion of the carriage. In relation to that head, head 20 is located with some offset and is supported by an intermediate plate 31. The latter is connected to the carriage by a pivot unit 24 around which head 20 turns during carriage movement. Pivoting of head 20 is carried out by the cam 22 when the cam follower 21 (supported by plate 31) is following profile 22*a* of cam 22 which is connected to the drive housing (not shown). Torsion spring 23 is incorporated in the pivot unit 24 to insure a constant contact between the cam follower 21 and cam 22. An elongated hole 32 is provided in the carriage to permit the cam follower 21 reach the cam at any radial location of the carriage. A partial cutout in FIG. 9 permits to see hole 32 in more details.

To reach the inner disc track 42, carriage 30 must be relocated to position 30*a* (shown in phantom lines). In this case, head 10 occupies position 10*a* and its objective lens 11*a* is placed on track 42. During such a motion of the carriage, plate 31 is pivoted by cam 22 into position 31*a* so that the second head 20 being in position 20*a* is permitting its objective lens 12*a* reach the inner track 42 and cross it at the same angle as in its starting position 12.

Figure 10:
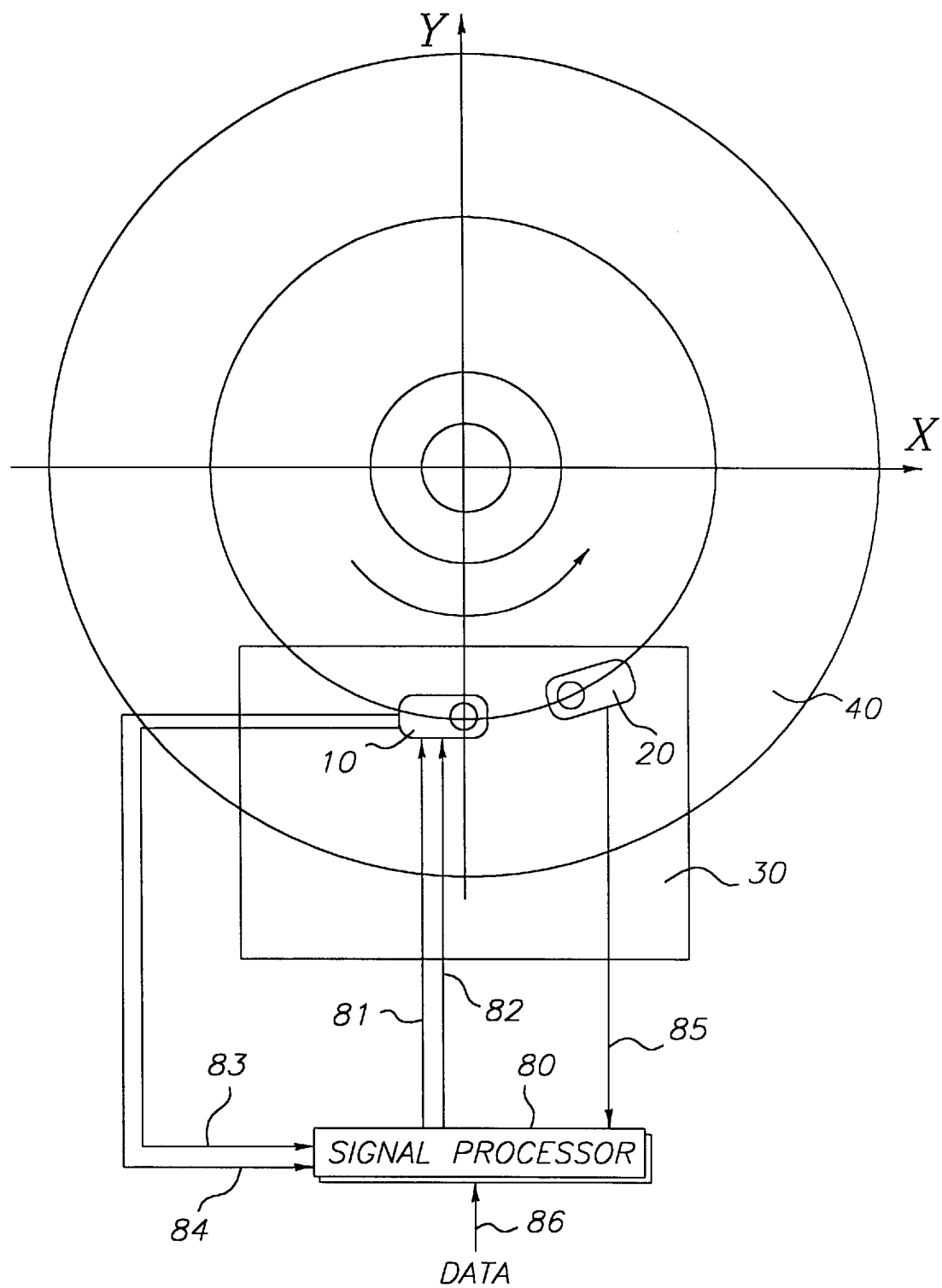
FIG. 10 is a schematic diagram showing both read and write heads and circuitry for adjusting the operation of the write head in response to the read head signal.

FIG. 10 shows two optical heads functioning according to the present invention. As illustrated, there are two optical heads 10 and 20 which are mounted on a common carriage 30. The heads are aligned on a track of the disc 40. The signal processor 80 is electrically connected to both optical heads 10 and 20. As shown, there are two inputs to optical head 10, a write power control line 81 and write data signal line 82. Input data for recording is applied on line 86 to signal processor 80. Alternatively, the signal processor 80 can adjust the write laser pulse timing of the write head in response to the read head signal. The operation of these signals is conventional and well understood by those skilled in the art. A tracking signal is delivered on line 83 to the signal processor 80 and a DRDW signal is delivered on line 84 to the signal processor 80. A read signal from the head 20 is also delivered over a line 85 to signal processor 80. In operation, the write power and write data signals are adjusted by the signal processor 80 to optimize the recording process as measured by the read head 20. The recording quality is determined in the signal processor 80 by comparing the read signal delivered on line 85 to the desired data signal delivered on line 86. The signal processor 80 is thereby responsive to verify the data recorded by the write head during recording.

The invention has been described in detail with particular reference to certain preferred embodiments thereof, but it will be understood that variations and modifications can be effected within the spirit and scope of the invention.

PARTS LIST

10 head
10*a* head on the inner track of the disc
10*b* head on the intermediate track of the disc
11 lens
11*a* lens on the inner track of the disc
12 lens
12*a* lens on the inner track of the disc
20 head
20*a* head moved toward the inner track of the disc
20*b* head moved toward the intermediate track of the disc
20*c* head on the inner track of the disc
20*d* head on the intermediate track of the disc
21 cam follower
22 stationary cam
22*a* stationary cam
23 spring
24 pivot unit
30 radial access carriage
30*a* radial access carriage with heads on the inner track of the disc
31 intermediate plate
31*a* intermediate plate with head 20*c* on the inner track of the disc
32 elongated hole in carriage
40 optical disc
41 outer track of the disc
42 inner track of the disc
50 linear motor
60 linear motor
70 guiding rod
71 guiding rod
80 signal processor
81 write power control line
82 write data signal line
83 tracking signal line
84 DRDW signal line
85 read signal line
86 data signal line

What is claimed is:

1. Apparatus for optically writing information on or reading information from a disc having tracks, comprising:

a) a carriage moveable in a radial direction relative to the disc tracks and at least first and second optical heads spaced and mounted on the carriage;

b) the first and second optical heads being moveable with the carriage, and at least one of the heads being pivotally mounted;

c) the first head being adapted to write information on a track of the disc, the second head being adapted to read information and produce a signal representative of recorded data;

d) means coupled to the pivotally mounted head and adapted to pivot the optical head as the carriage is displaced in the radial direction so that both the first and second optical heads are spaced from each other but aligned on the same track within the tracking ability of the head so that the cross track direction of both heads remains constant as the heads remain located on the same track; wherein such coupling means further includes means defining a cam surface which is selected to cause the second optical head to be aligned on the same track as the first optical head, and means including a cam follower engaging the cam surface and coupled to the pivotally mounted head and adapted to pivot the optical head as the carriage is displaced in the radial direction so that both the first and second optical heads are aligned on the same track; and e) means responsive to the read head signal to adjust operation of first head during writing to improve the recording of data.

2. The apparatus of claim 1 wherein the signal responsive means from the second head is further adapted to verify the data recorded by the write head during recording.

3. The apparatus according to claim 1 wherein the signal responsive means from the second head adjusts the power of the write laser in response to the read head signal.

4. The apparatus of claim 1 wherein the signal responsive means from the second head adjusts the write laser pulse timing of the write head in response to the read head signal.

* * * * *

UNITED STATES PATENT AND TRADEMARK OFFICE
CERTIFICATE OF CORRECTION

PATENT NO. : 5,856,964
DATED : January 5, 1999
INVENTOR(S) : Ikuo KURACHI

It is certified that error appears in the above-identified patent and that said Letters Patent is hereby corrected as shown below:

On the Title page, in the ABSTRACT, Item [57], line 12, after "is" insert --disposed--.

Signed and Sealed this

Ninth Day of November, 1999

Q. TODD DICKINSON

Attest:

Attesting Officer

Acting Commissioner of Patents and Trademarks